455-12 AU 263 EX
E4819 OR 3,546,391

United States Patent

[11] 3,546,391

[72] Inventor Martinus denHertog
Brasschaat, Belgium

[21] Appl. No. 609,598
[22] Filed Jan. 16, 1967
[45] Patented Dec. 8, 1970
[73] Assignee International Standard Electric Corporation
New York, N.Y.
a corporation of Delaware
[32] Priority Jan. 18, 1966
[33] Great Britain
[31] No. 2275/66

[54] SATELLITE TELEPHONE SYSTEMS WITH SEPARATE MESSAGE CIRCUITS AND SIGNALLING CHANNELS

7 Claims, 6 Drawing Figs.

[52] U.S. Cl. ........ 179/18
[51] Int. Cl. ........ H04q 3/56
[50] Field of Search ........ 179/18.19, 18.21, 18.211

[56] References Cited

UNITED STATES PATENTS 3,377,431 4/1968 Wright et al. ........ 179/18(.21)

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel, Phillip A. Weiss and Delbert P. Warner

ABSTRACT: A variable address satellite system wherein: (a) every channel (i.e. one-half of a 4-wire circuit) can be seized at a switching center at only one of its extremities, e.g. the transmitting end; (b) the two channels required to permit conversation in either direction for a call need not be permanently associated but are seized independently from any free channels available in each direction, one at each, to constitute a random pair; (c) the system depends on the use of a common signalling channel. It is useful for both satellite and surface circuits to avoid double seizures, which are liable to occur on bothway circuits with long propagation time.

G 1512858
F 1513619
B 1177753

SATELLITE TELEPHONE SYSTEMS WITH SEPARATE MESSAGE CIRCUITS AND SIGNALLING CHANNELS

This invention relates to signalling and switching systems for long-distance telecommunications systems in which a plurality of speech or other message circuits, or groups of such circuits may, for example, include the use of an artificial earth satellite designed to relay communications from any one to any other of a number of switching centers.

In the present specification the term "speech circuits" denotes the equivalent of a 4-wire link. Each speech circuit comprises a "forward channel" and "return channel," each of which is equivalent to one of the pairs of wires in a 4-wire link. The term "signalling channel" denotes a circuit which is independent of any speech circuits and is used solely for signalling and administrative purposes. It is convenient therefore to use the term "signalling channel" in contrast to the term "speech circuit" and its subsidiary terms "forward channel" and "return channel."

The signalling channels in the invention serve a large number of message circuits. There are two signalling channels, one serving the traffic in each direction. Signals for emission over the signalling channels may be subject to some queueing delay but the traffic load is planned in such a way as to prevent the delay being objectionable.

It is a characteristic of geo-stationary communication satellites that the propagation delay is much longer than for terrestial circuits. In some cases the signalling channels serving satellite circuits may be placed in terrestial circuits but this will not be possible in all cases.

A common signalling channel provides some new possibilities for the initial seizure of a message circuit. The seizing signal can be sent over the signalling channel before the selection of the message circuit is completed. Such an arrangement is beneficial in two different applications.

The invention provides a switching centre for a telecommunication system including register devices for the reception of digital information describing a wanted or called party and means for assigning a label on a signalling channel for a speech channel responsive to the originating a call, said means being jointly responsive to the registered digital information and to the label information received over the signalling channel for selecting a speech or message circuit.

When considering the integration of communication satellite systems into a world-wide telecommunication network with automatic or semiautomatic operating methods several new problems are encountered, resulting from the mutual influence of the possibilities offered by multiple access satellite systems on one hand and the properties and facilities of the new signalling and switching methods to be employed on the other hand.

A bothway message circuit may be selected at either termination and if the propagation time is long there is a danger of double seizures of the message circuit. Double seizures can be eliminated by ensuring that all selection of such bothway circuits is made at one terminal only. When a selection is needed at the other terminal a seizing signal is sent over the signalling channel. On reception the seizing signal causes the selection of a free circuit whose identity is sent back to the other terminal so that the connection may be suitably extended.

In the case of variable destination satellite, a ground station may have a group of one-way message channels each of which has receiving terminations at a number of other ground stations. In order to provide a message circuit it is necessary to make a temporary association with some other channel of the same character. If selection of both said channels is made at one centre there is the danger of double seizure because the incoming channel may have been previously seized at some other center. Double seizure can again be eliminated by the transmission of a seizing signal over the signalling channel which causes the selection of a free channel whose identity is sent back to the other terminal so that the connection can be suitably extended.

Each signal sent over a common signalling channel must be accompanied by some label or other form of identity in order that the receiving centre may recognize the circuit to which the signal refers. Whether the signals pass direct or pass through a repeating process at some intermediate signalling centre the label also describes the center from which the signal has been sent.

In the case of the bothway message circuit the initial seizing signal can be associated with a temporary label which indicates a new call from the centre associated with a particular ground station. When the message circuit is selected at the distant centre the signal sent back will carry the temporary label and the identity of the message circuit selected. As a consequence the connection can be extended and further signals associated with the call attempt can use the label of the selected message circuit. The temporary label can therefore be released very soon after it is taken into use. It may also be noted that further address information may have been passed with the temporary label before the message circuit is connected.

In the case of the variable destination circuit the same procedure could be used but it is also possible to select the forward channel and use the label of this channel to accompany the seizing signal.

In both applications it is possible that a circuit or channel cannot be selected in proposal to the seizing signal because all are engaged. In this event a busy signal can be sent back to inform the distant end.

It is envisaged that the transmission channels provided by satellites will include not only point to point circuits but variable destination which are characterized by the fact that one terminal which may be either a transmitting or receiving terminal is associated with a plurality of other terminals which are of the opposite type. Such circuits are unusual because the 'go' and 'return' channels of a complete message circuit are not permanently associated together. In each new call it is necessary to select a free circuit in each direction and to provide suitable switching connections to build these channels into the connection.

On the other hand, the world network proposed by the International Telegraph and Telephone Consultative Committee (C.C.I.T.T.) includes use of new signalling methods on separate data transmission channels, permitting the speedy transmission of additional information not provided in present day systems, and provides unprecedented possibilities for making efficient use of the whole of the international network. Such a signalling system is disclosed in U.S. Pat. No. 3,377,431 to E.P.G. Wright et al.

The C.C.I.T.T. No. 6 signalling system (No. 6 S.S.) is characterized by the use of signalling channels provided separately from the message (speech) circuits. Each of these signalling channels is used in common for a relatively large number of speech circuits to transmit part or all of the signals required to be transmitted in conjunction with each telephone conversation established on these speech circuits. For the purpose of transmitting the signals on the common signalling channels, serial data transmission technique is employed, using a synchronous mode of operation such as 1,200 or 2,400 bits per second with signal "words" of fixed length. Each of these "words" will contain a number of bits called the "label," which serve to identify the signal with a particular speech circuit or connection. Furthermore, a number of bits provide the actual signal content and finally a number of check bits. Error control and correction will be provided by using error control signals. The terminal equipment associated with each signalling channel provides a data stream in the two directions, so that each signalling channel comprises a transmission channel for each direction.

The scanning of input, the general processing and the distribution of signals between stores is described by R. W. Ketchledge of Bell Telephone Laboratories, Murray Hills, N.J., in his paper on the No. 1 Electronic Switching System presented at Globecom VI 1964.

It is desirable that the satellite system uses similar methods for signalling as will be employed by the No. 6 S.S. on terrestrial circuits (i.e. all nonsatellite transmission media) and notably that separate signalling channels are provided in association with the satellite links that are capable of transmitting information required by the interconnected circuits at the necessary speed. In the absence of such common signalling channels in association with the satellite, nonuniform methods of operation would result, necessitating signal conversion at the ground stations and causing intolerable signalling delays on the international part of the connection.

Owing to these considerations, it will be assumed in the following description that, in conjunction with a satellite system, separate signalling channels will be used of a kind as will be employed with the No. 6 S.S. on terrestrial circuits.

In order that the invention may be more clearly understood an embodiment thereof will now be described with reference to the accompanying drawings in which.

In the system shown in FIG. 1 a number of switching centers A, B, C, D and E (hereinafter referred to as centers) are linked to one another by groups of speech channels all of which are relayed via a satellite S. The latter may be either orbiting or synchronous.

Figure 1:
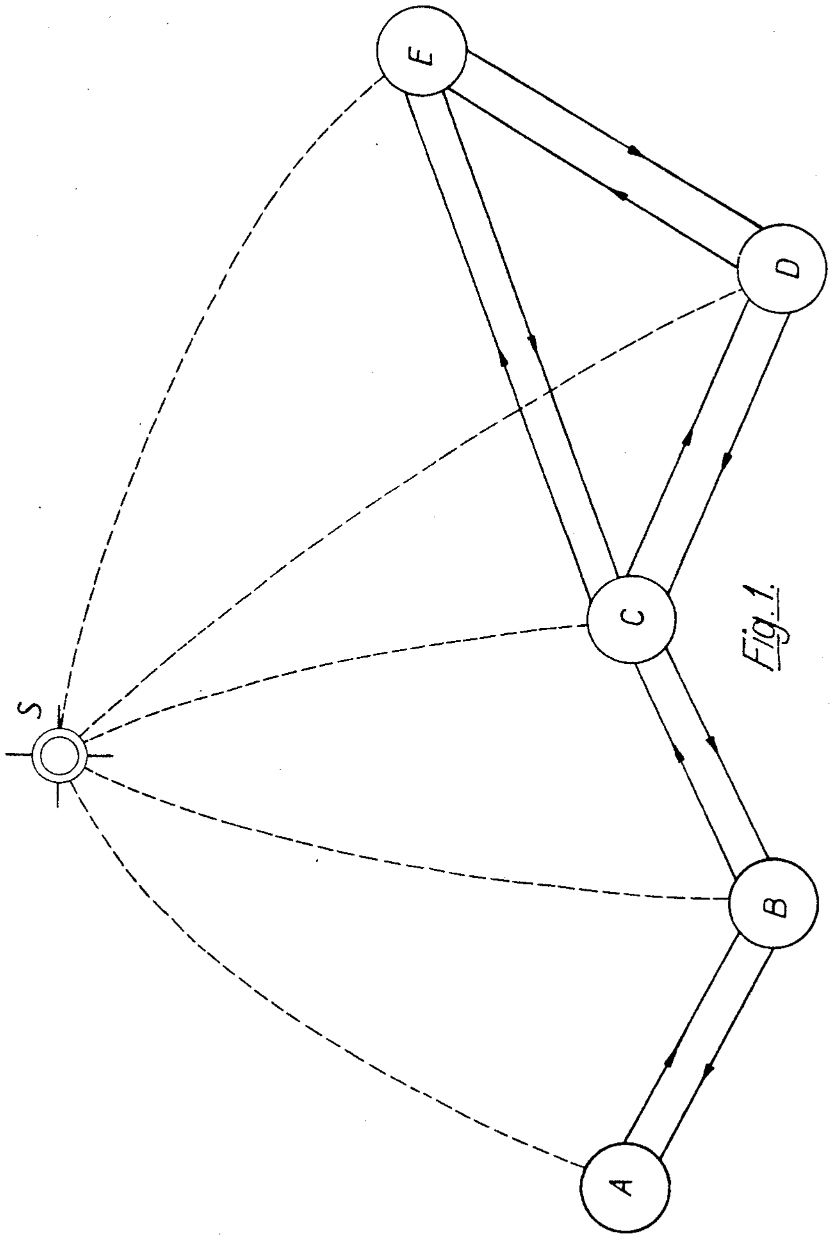
FIG. 1 illustrates a possible telecommunication system employing a satellite.

The centres A, B, C, D and E in FIG. 1, besides being linked by the speech circuits, shown as dotted lines FIG. 1, are also connected to each other by separate signalling channels, shown by solid lines in the drawing. The signalling channels are depicted in this example as being surface channels, either cable or radio links, but they could be relayed via the satellite S if necessary. It will be noted that the centres are not all directly interconnected by common signalling channels. In the case of signals from A to B a single transmission is concerned, but in the case of signals from A TO C, D and E the signals are passed on a link-by-link basis. The source of the signals should be indicated so that the appropriate return channel may be selected for example from D to A.

The satellite circuits between A and B may be fixed point-to-point 4-wire circuits similar to terrestrial except for the greater propagation time due to the long path over which transmission takes place. If the seizing signal is passed over the message path there is some danger of a bothway circuit being seized at both terminations. The use of the separate signalling circuit between A and B eliminates this possibility. A register at A receiving a call which needs connection via B can send a seizing signal to B before any message circuit has been selected for the connection. B therefore receives the seizing signal which indicates a new call for which a message circuit is needed. B can therefore select a free circuit and send a signal to A to indicate the identity of the circuit selected. If there are no free circuits it will send back a long signal. In consequence all selection of A—B circuits can be made at B and double seizure due to the long propagation time is avoided.

The signalling terminations each include a store to hold signals awaiting transmission and whereas the signals will normally be transmitted in association with a label defining the message circuit to which the signal refers it is also possible to employ a series of temporary labels which may be used for signal association up to the time that a message circuit is selected. The invention therefore contemplates that when a new call arrives, a preliminary selection is made and a temporary label is assigned to the call. Thereafter, the label is used for association with the seizing and other signals until selection is completed. The process of remote terminal selection of the message circuit is somewhat analogous to the manual operation with order wire except for the positive association given by the label.

Reference has been made to the transmission of a seizing signal on the common signalling channel in order to initiate remote selection. It should be understood that the expression seizing signal means the first signal associated with a label which is in the idle condition. The seizing signal could be the next digit of the address or some service signal preparatory to establishing the call.

In some cases forward and reverse satellite channels can be seized simultaneously but safeguards are needed to overcome the confusion arising from double seizure if the propagation time is too long. With variable destination satellites there is a need to associate together the forward and reverse channels.

Another possibility is to assign a certain number of satellite channels from one centre for use to any group of predetermined other centre.

In each of the above examples reference has been made to selection of a channel or channels at the remote end of the satellite circuit. The purpose is to avoid double seizures in all cases in which a long propagation time introduces a serious unguarded period at another centre or centres. The principle of operation in the invention is to avoid selection of the same channel or circuit at different centres. In the case of point-to-point point circuits either terminal can be used for all selection. In the case of variable destination channels the selection should always be made at the fixed terminal.

It is most desirable that the seizing signal causes a response at only one of the distant terminations, and that the reverse channel can be indicated without causing a response at a number of centres which are not going to be used for handling the call. It can be seen by reference to FIG. 1 that although there may be variable destination from A to C, D and E the signalling channel does not present the signals to all these three centres. Assuming there are 50 point-to-point message circuits from A to B and a further 20 which may be used from A to C, D or E, a series of 50 labels would be assigned for the A to B circuits, a further 60 labels could be assigned so that the 20 channels from A—C, A—D and A—E can be separately indicated. A label such as No. 100 might indicate a channel from A to D and a signal transferred from A to B with this number will be recognized at B as signal which must be forwarded to C perhaps with the same label No. 100. C in turn will recognize that this signal needs to be transmitted to D again perhaps with the same label No. 100. When the signal arrives at D it is recognized that it is addressed to D and that it has been sent from A.

It is not necessary that the label number 100 from A—B is also 100 from B—C and C—D. When the signal arrives at B reference is made to the label store which will contain instructions for the forwarding of all signals. These instructions must indicate the signalling channel and the label which should be used for forwarding. Any available label can be used between B and C and between C and D. Should the label between C and D be 61 D will know that it is a signal from A. The response signal indicating the channel selected at D will use the label 61 at D and it will arrive at A using the label 100. This is essential and necessitates that at a transit centre it is necessary to cross connect the forward and reverse signalling paths identically i.e. A—B 100 may be cross connected to B—C 61 consequently C—B 61 must be cross connected to B—A 100. If a satellite circuit is available at many different centres both for transmitting and receiving, a similar procedure can be used to avoid double seizure. A specified centre is employed for the assignment of the whole group of circuits. When a register recognizes that the call needs to employ such a circuit it transmits an "Order Signal" to the assignment centre. This signal is accompanied by a temporary label. If there are several groups of random destination satellite circuits there should be corresponding groups of temporary labels so that the assignment centre has the full requirement. When the register receives the circuit number of the circuit assigned it makes connections to it in the normal manner and thereafter transmits a seizing signal to the wanted center with a label indicating the circuit selected. On the conclusion of the call the Clear Forward and Release Guard Signals are transmitted in the usual manner. On receipt of the Release Guard Signal it is necessary to retransmit it to the assignment centre to allow the satellite circuit to be reemployed.

The process described for making a satellite circuit idle from an assignment centre can also be used to permit an assignment center to obtain further assignments from a Master assignment center.

The invention proposes a system in which the above problem for variable destination satellites can be overcome by arrangements which fulfill the following two conditions:

a. that every channel can be seized at one switching center only at one of its extremities e.g. the transmitting end.

b. that the two channels required to permit conversation in either direction for a call need not be permanently associated, but are seized for each call independently from any free channels available in the appropriate direction, one at each of the two switching centres involved, to constitute a random pair.

It can be seen that a satellite system incorporating variable destination circuits is most conveniently arranged in a manner to satisfy these conditions so that it can be made to function satisfactorily without a common assignment centre.

One operating procedure for such a system would be as follows:

a. The control equipment at the outgoing centre determines a free speech channel.

b. As soon as the free channel has been determined, a signal is transmitted e.g. via a separate signalling channel directly or indirectly to the other center. This signal will, besides other information, contain information on the identity of the centre from which the channel has been determined and the label number of the selected channel.

c. The control equipment at the incoming centre uses the identity information (label) of the first centre to cause the determination of a free channel in the opposite direction.

d. As soon as the incoming center has chosen a free reverse speech channel, its control equipment causes the transmission of a signal directed to the first centre exclusively, which signal contains the identity information of both forward and reverse channels to be used.

This information may be used by the control equipment of the outgoing centre to extend the call over the forward link previously selected and the reverse link indicated by the incoming centre.

The identities of both channels used are stored at both switching centres so that at each of them it will be known which two channels are temporarily associated to serve a call.

It will be observed that the switching operations at both centres, as well as the transmission of the reverse signals referred to, may take place concurrently with the transmission of further information from the calling to the called centres, as required to complete the connection.

It may also be observed that the operations as described above are very similar to those envisaged to take place at international transit centres, the important points in this connection being that the control equipments at the switching centres are arranged to choose a free speech channel and to cause the necessary switching operations to take place to connect with the outlet. The principle difference between the operation as described here and that envisaged at international transit centres for the interconnection of surface circuits is that in the latter case the two channels to be used for speech in either direction are permanently associated to form a 4-wire circuit, which is selected at the outgoing centre exclusively whereas according to this invention one channel is determined at each of the two centres involved and the two channels are selected independently at each centre by separate switching operations. The incoming centre has to transmit the additional signals for this purpose to inform the outgoing centre on the identity of the two channels that are temporarily associated.

The control and switching equipments to be provided at international transit centres can be designed to operate so that both surface circuits and satellite links can be switched by the same equipment at the international transit centres, if necessary.

On the other hand, this method of assigning channels independently may also be used between international transit centres for all surface circuits using the No. 6 S.S. This would not cause any delay in the completion of the connections, notably on seizure, and would offer the advantage that signalling and switching operations for surface and satellite circuits would become completely identical.

Furthermore, this method offers a means of operating bothway circuits without double seizures, even with long propagation times.

Figure 2:
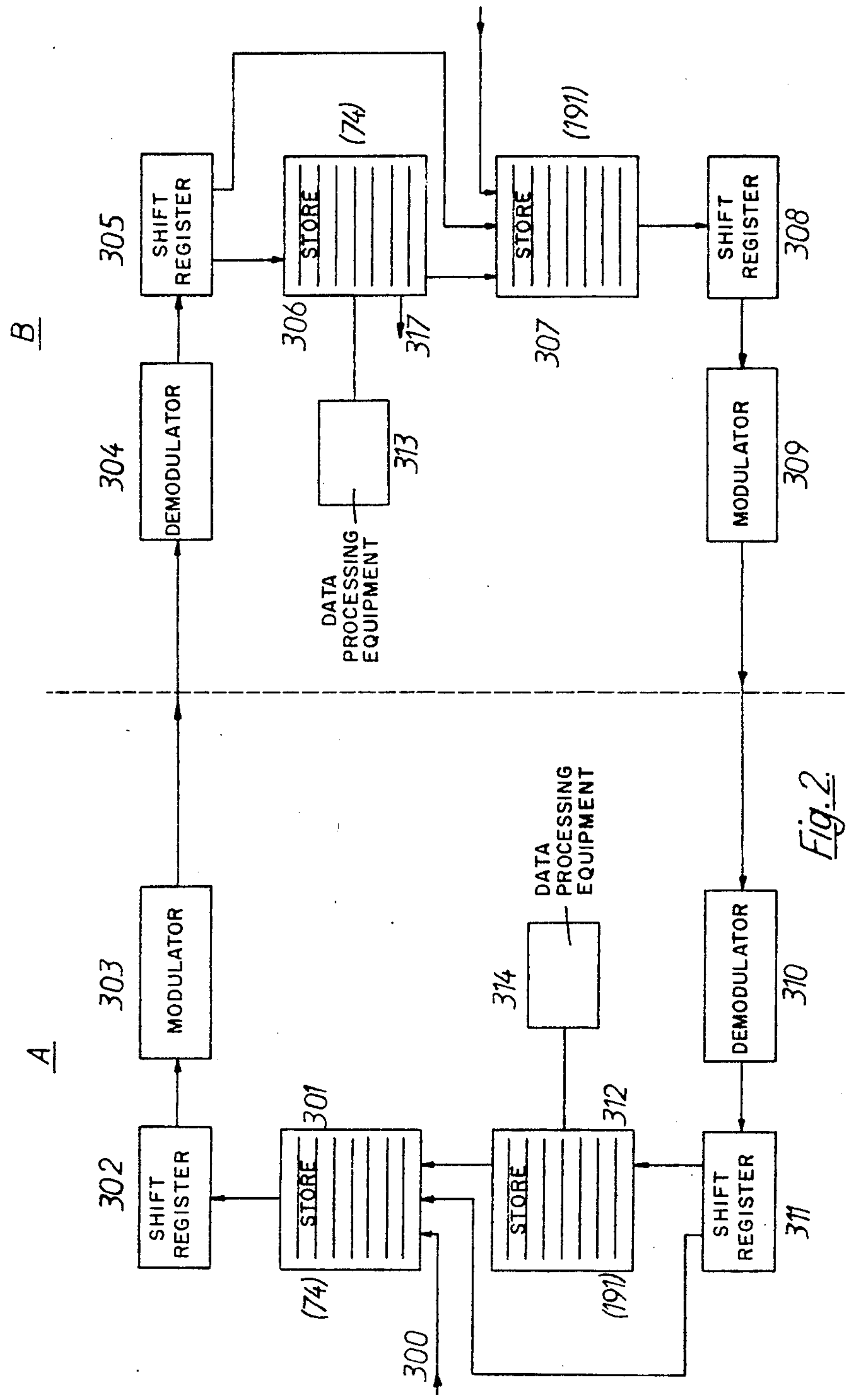
FIG. 2 is a block diagram of the switching control equipments in two switching centers of the system shown in FIG. 1, and FIGS. 3, 3A—3D constitute a flow diagram detailing the processing of information in one terminal of FIG. 2.

The actual signalling equipments required at each center are illustrated in the block diagrams of FIG. 2. which show two centres A and B for example.

Transmission of data over the two channels terminated by modulators 303 and 309 and demodulators 304 and 310 in FIG. 2 can be of any of the well-known arrangements used for dataphone and similar services.

Means for adding check bits and for detecting whether the received signal units are correct can be used but have no direct bearing on the invention.

Signal information relating to the setting up and supervision of messages is assembled in the Stores 301 and 307 from information received over input signal wires, such as 300. Complete signals are transferred in parallel form to the shift registers 302 and 308 from where they are passed in serial form to modulators 303 and 309.

The outputs from demodulators 304 and 310 are transferred to shift registers 305 and 311 in serial form and subsequently passed to label stores such as 306 and 312 for processing.

The label stores will include the information to indicate how the processing should proceed. It may indicate that the message circuit is free, that it is connected to a stated register, that it is switched through or that it is permanently connected through. The label store can also announce the type of circuit and whether special selection of a reverse path is necessary.

The clocking arrangements to maintain the shaft register 302 in synchronism with the modulator 303 and for stepping the shift register 305 in antiphase with the signal output from 304 follow normal data transmission practice.

The shift registers and channel stores can be of conventional types (e.g. transistor and ferrite). A buffer store may be introduced between 301 and 302 to allow waiting signals to be dealt with on a predetermined precedence basis.

The signalling channel in the opposite direction includes corresponding items. Calls may be set up from either terminal.

The stores 301 and 306 contain storage locations for each of the message channels served by the signalling channel connecting 303 and 304. The stores 307 and 312 serve the message channels in the other direction.

The shift register 305 gives access to both 306 and 307 as signals may be directed to either store; similarly 311 gives access to both 301 and 312.

The store 306 has access to data processing equipment 313 for the purpose of obtaining routing and other information as explained later. Store 306 is also designed to pass information to store 307 which is associated with the message channels served by the signalling channel between 309 and 310; it also has access via 317 to similar stores associated with other common signalling circuits for the purpose of forwarding signals when necessary.

A speech link is formed and taken into use in the following manner:

1. The processing and transfers of information between 301, 307 and their associated shift registers is controlled by wired logic or programmed computer which is stimulated by the dialed or keyed digits of a new call attempt. The receipt of one or more digits leads to the need to select a free channel in some specified group; this enables the appropriate label store such as 301 to be identified. The logic scans through the channels in the group designated to find and engage a free channel. A typical process could comprise addressing the lowest numbered channel, and, if this is engaged, adding one to the address and so on. It is also necessary that the logic should know the number of the last channel in the group and prevent further additions if the last channel is found to be engaged. The detailed processing of information will be described below with reference to FIGS. 3A 3D.

Figure 3A:
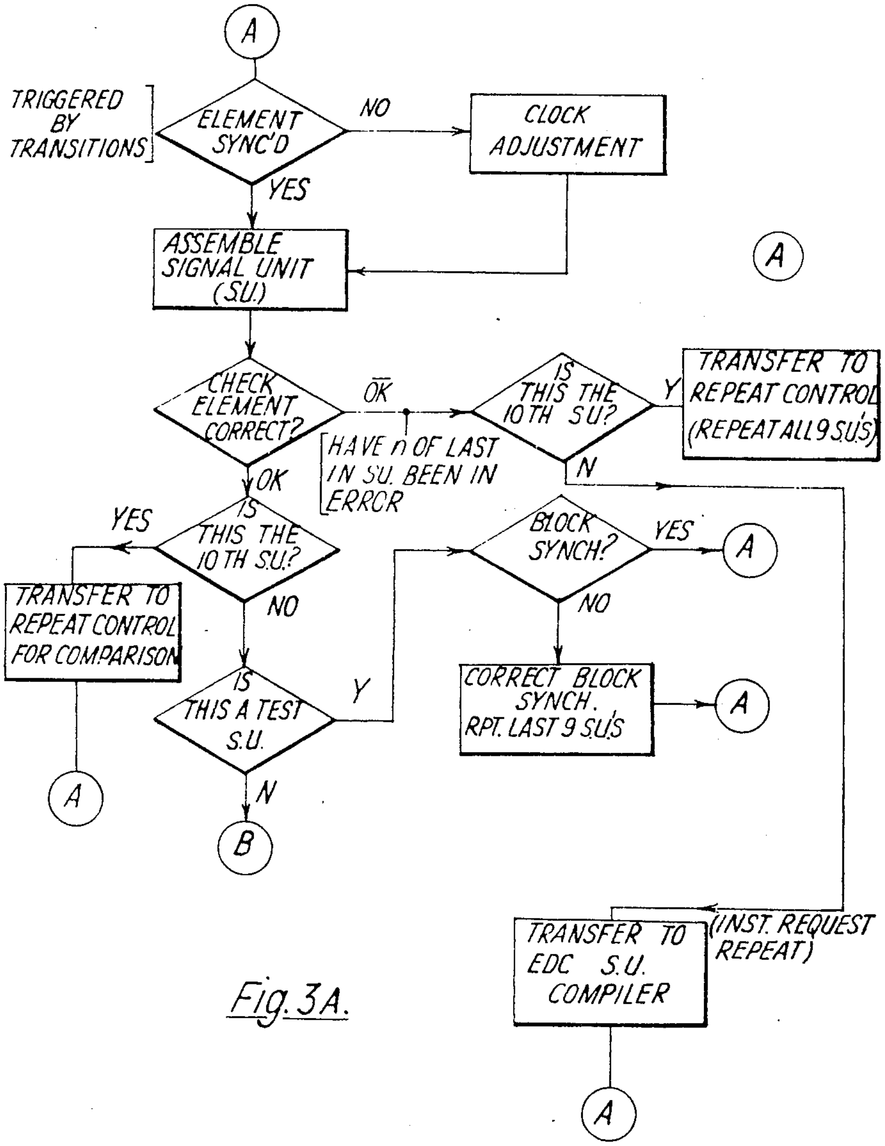
Figure 3B:
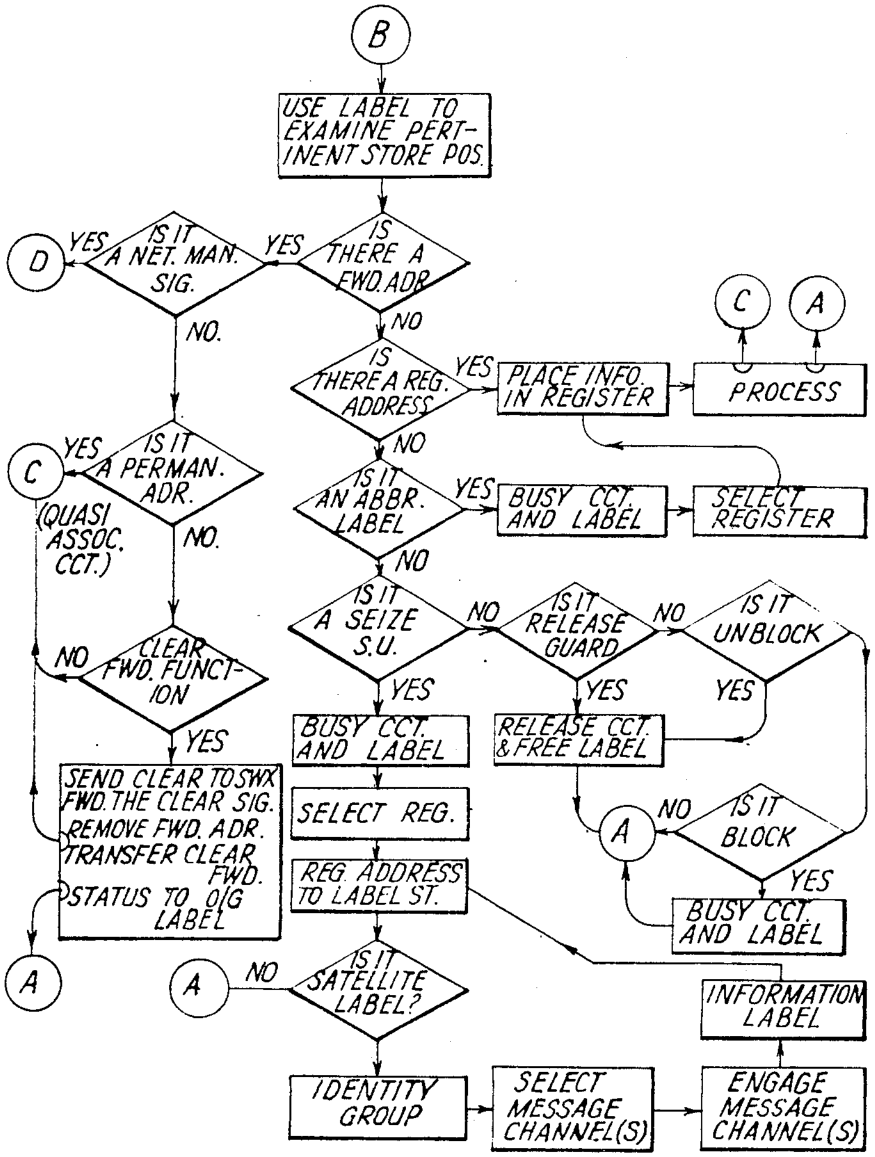

The flow diagram (FIGS. 3A—3D) shows the processing of a common signalling channel. It is based on the assumption of a series of signal units of equal length. FIG. 3A shows the normal synchronizing and checking functions. Bit synchronism is accomplished by each pulses present in the received signal units. The signal unit is synchronised by test signal which have a series of reversals. Each signal unit includes a number of check bits permitting a list to be made to see whether errors are present or not. Erroneous signal units are connected by retransmission. The process of retransmission is controlled by using each 10'h signal unit to announce which of the last block of signal units has been correctly received.

Having checked synchronism the first stage of the processing operates to remove test (idle) signal units, erroneous signal units and the error control (10'h) signal units. The remaining checked signal units are passed on for the next stage of processing, illustrated in FIG. 3B.

Each signal unit includes a label and this portion of the signal unit is used to address a label store in which is written information concerning this particular message circuit. It may indicate a free circuit, one which is connected to a register for setting up a connection or it may indicate that the connection is established. In the latter case the label store includes forwarding information to which subsequent signals should be sent. Similarly if a register address is given the new signal is passed to the appropriate register for action.

Should there be no forwarding address in the appropriate location of the label store the function part of the signal is examined to see whether it is a seizing signal. If this is so the message circuit is engaged in the label store to avoid the circuit being taken for another call. Furthermore a test is made to find the next free register to which the seizing signal is passed. The address of the register is written in the label store so that further signals for the same connection will be passed to proper register.

A further question can also be asked to ascertain whether this is either a temporary label applying for the selection of a suitable message circuit or whether it is a label associated with a variable destination satellite which also needs the selection of a suitable return channel.

In both cases the label number indicates the centre from which this signal has been sent and therefore permits a search to be made in the group of circuits may be made by checking the engaged or free condition of the different circuits in the label store.

Figure 3C:
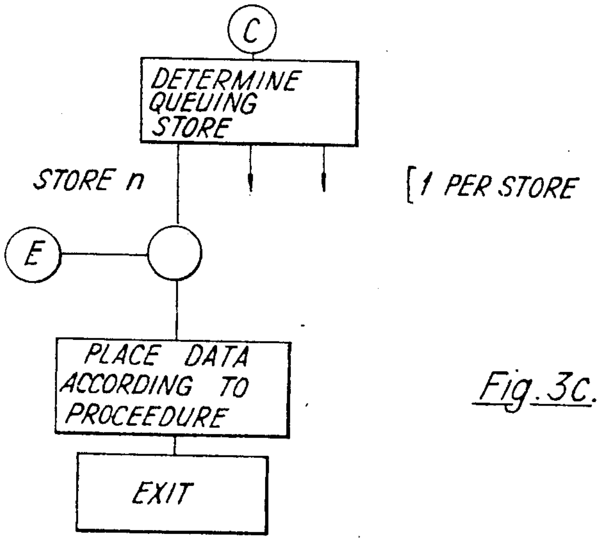

The third storage, FIG. 3C, of the processing concerns the marshalling of signals for transmission over the appropriate signalling channels. Each register has to consider the emission of signals both towards the calling and called sides of the connection. The signals towards the calling side must be associated with the label of the message circuit which has extended the connection to the register. This information is available to the register so that it is able to select the proper queueing store in which the backward signal can be inserted to await its turn for emission.

In the case of signals towards the called party it is only after the outgoing direction has been determined that the register can record a forwarding address. This address may be used for passing forward the national number but at some time the register will have completed its setting up work and at this time it can write a forwarding address in the label store of the incoming message circuit. In consequence subsequent signals are passed forward without reference to the register. Exceptionally the Clear Forward and Release Guard Signals must be recognized in each transit centre and when received these signals must initiate the release and disengagement of the message circuits.

The register can therefore pass back the identity of the satellite circuit or channel selected. This identity is passed back by transferring the circuit identity which is associated with the label identifying the seizing signal which initiated the checking operation. This signal is placed by the register into the appropriate queue.

Figure 3D:
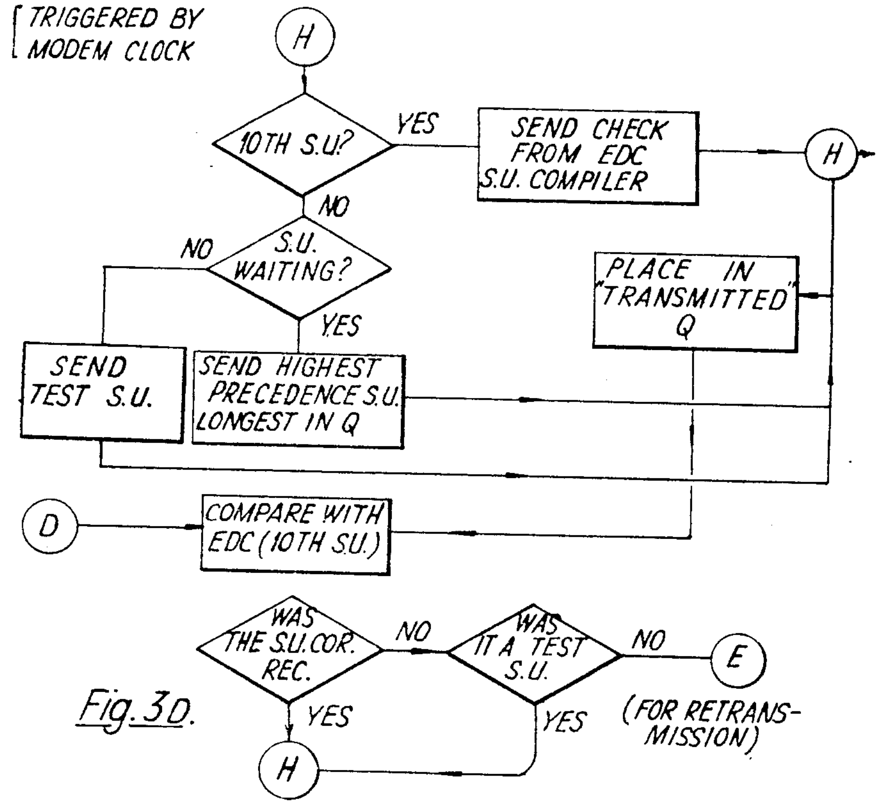

The final process, FIG. 3D, concerns the withdrawal of waiting signals for emission. As the signal units may have to be retransmitted subsequently it is necessary to hold them until an acknowledgement is received that they are correctly received at the distant side. If no acknowledgement is received the signal units must be reinserted in the waiting store.

2. In the case of point-to-point satellites the process described in 1 is used either to find a free circuit or a free temporary label. A similar search is needed for a temporary label to be sent to an assignment centre.

3. The label of the channel selected is indicated by the address of the store location concerned.

4. A signal comprising either:

a speech channel label and a seizing signal or a temporary label and a seizing or Order Signal is passed to the shift register 302 either direct or through a buffer store.

5. The information will be transmitted over the signalling channel in serial form being delivered to the shift register 305. This register will be scanned periodically to withdraw the signals as they become available. The label of each signal determines to where it should be transferred. The store 306 has a location for each of the labels and the contents of the appropriate location is read out in order that the type of speech circuit can be recognized and the presence of any forwarding address. The recognition that the label represents a satellite circuit will initiate the processing to select a channel or circuit and to return a signal to indicate the ideality of the selection made.

In addition it will be evident that a register is needed and when this has been selected its forwarding address will be inserted so that subsequent signals will be passed to the correct register.

As will be explained later the label store may contain information to the effect that every signal received should be forwarded without processing. Sometimes, processing is required and this can take place in translating register or data processing equipment 313. When the decision is reached that the call attempt is directed to another centre routing information such as the appropriate common signalling channel, is obtained. If the call attempt is addressed to the centre concerned further signals are processed locally.

6. In either case, for variable destination channels it is necessary to assign a speech channel for the return direction. The label of the forward speech channel has defined the two centres to be connected by the return speech channel. The computer logic circuits are therefore able to indicate a search in the appropriate group of speech channels in store 307 for a free channel. It will be observed that the selecting process can be identical to that previously described in connection with store circuit used in 301.

For point-to-point and fully variable destination circuits the procedure is similar except that the selection process finds the chosen circuit to be used.

7. The label of the reverse speech channel as indicated by the address of the chosen channel in store 307 needs to be transferred to the register 313 for the setting of the appropriate selector. This selector then seizes the reverse speech channel identified by the label. Also, the register stores the location of the forward speech channel in circuit 306 in order to ensure that the reverse speech channel is released at the end of the call.

8. Another process which needs to be initiated is to inform the distant centre of the identity of the reverse channel selected. This is achieved by transmitting a signal over the reverse signalling channel. This signal comprises the label of both the forward and backward speech channels that are to form the circuit. There may be no available reverse channel to assign and in this case a signal is returned to the originating end to indicate there is congestion. In the case of a temporary label the identity of the selected speech circuit is sent back with the temporary label.

9. Because the call described has been initiated from 301 to 306 the forward channel label is used for the identification of all forward and reverse signals relating to the call. Had the same pair of channels been selected for a call set up from 307 to 312 it would be the label selected from the label store 307 which was used throughout.

10. When the reverse signal reaches the shift register 311 its label will ensure that the signal is passed to the location in 301 reserved for channel 74. The selected reverse channel as indicated by the label is thereafter passed to 314 for the appropriate selector to be positioned. As the two channels of the circuit are not fixed it is necessary to have independent switches for the two channels.

It should be explained that the full channel label must identify both the speech channel and the signalling channel over which it is controlled. It is unnecessary to include the signalling channel identity during the transmission over this channel but the full label is needed in order to make the proper selection.

The use of a communication link with independent switching for the forward and reverse channels has been described in connection with a Time Assignment Speech Interpolation (TASI) telephone system as described in Reference Data for Radio Engineers, Fifth Edition, Howard W. Sams & Co., Inc., March 1969, at Section 30—32.

At the termination of the call a Clear Forward Signal will pass from 301 to 306. The logic associated with 306 will forward the Clear Forward Signal to release subsequent stages. It will also initiate a Release Guard Signal to be returned via 308, 309, 310, 311 to 301. When this signal is received, stare circuit 301 can be emptied. Thereafter, channel 74 is idle. The switching equipment can be released through the operation of data processor 314 when the Clear Forward is transmitted. The logic circuitry associated with 306 also controls a signal to 307 to disengage the reverse channel 191.

The required connection may be such that the signals transferred from 301 to 306 may need to be forwarded over another signalling channel. This situation will be indicated by Register 313 when the destination code is recognised. The translation facility will indicate the signalling channel over which the signals should be forwarded. The translator may also indicate the group of speech channels. When the label is determined the logic must ensure that the full label is inserted in the appropriate location of store 306 so that all further signals can be forwarded without reference to the Register 313. It is equally necessary that the store location of the second speech channel contains the full label of the first speech channel so that reverse signals can be forwarded. The procedure for selecting the reverse channel remains unchanged.

It should be understood that the foregoing description gives only one example of the manner in which the invention may be carried out.

The seizure of the speech channel may be delayed by the use of a temporary label which can accompany the Seizing Signal, destination code, etc. At some suitable moment a signal can be sent from 301 to 306 which announces that a speech channel label is replacing the temporary label. The receipt of this signal can initiate the same processing as before namely the selection of the reverse channel and the transmission of its identity to 301.

It should also be understood that if a temporary label is used it would be possible for Centre B to choose a speech channel to Centre A thereby requiring Centre A to select a suitable forward channel and to notify Centre B of the channel selected.

The previous description has made no mention of the fact that the main switching centres and the ground stations of the satellite network may be remote from one another. The transfer of network management signals will normally be between the switching centre but it will be appreciated that when switching centres surrender the assignment of a group of channels it will be necessary for the switching centre to inform its ground station of the changeover; in a similar way the switching centre which takes over a group of circuits must notify its ground station and receive confirmation before bringing the channels into use. If the receiving end of the transferred channels is also changed it will also be necessary to check by management signals that the receiving centre has brought the new channels into operation.

It may be envisaged that also all surface circuits provided with the No. 6. S.S. are arranged in the same manner, so that a uniform operation is obtained for surface and satellite circuits and the switching procedures at international toll centers and satellite ground stations become identical. This gives the possibility of bothway operation on all international circuits provided with the No. 6. S.S., without incurring delays on seizure, and without the possibility of double seizures.

The invention is also applicable where switching centres (not shown) which have no direct access to the satellite relay nevertheless have point-to-point circuits via a direct-access centre such as A in Fig. 1 to another direct-access center such as D, even to other nondirect-access centres associated with the direct-access centre D. Where there are two nondirect-access centres associated associated with A for example, they may be given proportional access to the satellite links according to the time of day or some other criterion. Where a direct-access centre such as D has variable address circuits to more than one nondirect-access center via A, then A should receive information to enable the selected channel to be properly switched.

In some cases a nondirect-access centre may need only a small number of circuits to link up with B, C, D and E via A for example. However, it would be necessary for such a centre to handle the full number of incoming channels from B, C, D and E. A subsidiary feature of the invention is therefore an arrangement in which a nondirect-access centre has a number of forward channels switched independently of a direct-access centre, through which it has access to the main network, but which is provided with a corresponding number of reverse channels from the direct-access centre which are switched by the direct-access centre to extend any incoming channel available to the direct-access center.

It is to be understood that the foregoing description of specific examples of this invention is not to be considered as a limitation of its scope.

I claim:

1. A switching centre for a telecommunication system with separate message circuits and signalling channels, including register devices for the reception of digital information describing a wanted or called party and means for assigning a label on a signalling channel for a speech channel responsive to the origination of a call, said means being jointly responsive to the registered digital information and to information received over the signalling channel for selecting a speech or message circuit, said means including a first digital information storage location for each speech channel, each storage location containing the label for, and information relating to the state of occupancy of, its associated channel, means for addressing a number of storage locations in response to a call attempt and selecting a location relating to a free channel, means for reading out the free channel label and modifying the information relating to the state of occupancy, means for passing the label to the signalling channel together with information associating the channel with the call attempt and means responsive to the label extracted from the storage location to seize the free channel.

2. A switching centre according to claim 1 in which the means for assigning the label is responsive either to digital information received from a calling party to select a forward speech channel or to a combination of digital information and a label received over the signalling channel, indicating that a forward channel to the centre has been seized, to select a reverse speech channel to the centre responsible for seizing the forward channel.

3. A centre according to claim 1 including a second digital information storage location for each speech channel, each second storage location containing information relating to the processing of the signals received over the signalling channel, translating register equipment, each second storage location having access to the translator register equipment so that incoming signals may be processed to enable correct use of the signals to be made.

4. A switching centre according to claim 1 including modulator and demodulator means for the emission and reception of digital signals over the signalling channel, first and second register devices, the first register device being arranged to store for onward transmission via the modulator means information received from the first storage locations and the second register device being arranged to store for transference to the first or second storage locations digital information received from the demodulator means.

5. A switching centre for a telecommunication system including register devices for the reception of digital information describing a called party, the centre also including transmitting and receiving terminals for signalling channels serving a plurality of message circuits and means in response to reception of said digital information to extend a connection over one of said plurality of message circuits by transmitting a seizing signal over said signalling channel and by receiving over said signalling channel digital information indicating the switching connection to be made.

6. A switching centre according to claim 5 including means for transmitting with the seizing signal a label for call identification whereby all digital information indicating the message circuit can be identified by the fact that it carries the same label.

7. A switching centre for a telecommunication system with separate message circuits and signalling channels including register devices for the reception of digital information describing a wanted party, means for determining in response to a call attempt a free channel with which is associated a label number, means for transmitting a seizing signal accompanied by said label over a signalling channel and means for receiving a signal over a signalling channel whereby another free channel can be selected to complete the message circuit.